US005136767A

United States Patent [19]

Blecher

[11] Patent Number: 5,136,767

[45] Date of Patent: Aug. 11, 1992

[54] REPLACABLE, AXIALLY SYMMETRIC SPECIAL TOOL FOR A PRESS

[76] Inventor: Ulrich Blecher, Sonnenbergstrasse 51, CH-6060 Sarnen, Switzerland

[21] Appl. No.: 609,395

[22] Filed: Nov. 5, 1990

[30] Foreign Application Priority Data

Nov. 7, 1989 [CH] Switzerland ........................ 4009-89-7

[51] Int. Cl.[5] .............................................. B23P 19/02

[52] U.S. Cl. ........................................ 29/235; 29/282; 29/283.5

[58] Field of Search ................. 29/263, 235, 237, 282; 254/134.3 R; 279/41 R; 269/87

[56] References Cited

U.S. PATENT DOCUMENTS

| | | | |
|---|---|---|---|
| 2,614,318 | 10/1952 | McCord | 29/263 |
| 3,837,661 | 9/1974 | Phillippi | 279/41 R |
| 4,059,883 | 11/1977 | Osborne | 29/263 |
| 4,132,665 | 1/1979 | Nelson | 254/134.3 R |

FOREIGN PATENT DOCUMENTS

| | | | |
|---|---|---|---|
| 567170 | 1/1945 | United Kingdom | 279/41 |

*Primary Examiner*—Robert C. Watson

*Attorney, Agent, or Firm*—Bachman & LaPointe

[57] ABSTRACT

The special tool for a press for joining connecting elements, arranged in the longitudinal or transverse direction on an incoming carrier belt or in a magazine guide to a front end of an inserted workpiece. The special tools designed as crimping tools comprise at least one pair of grips each, which grips are designed to be axially symmetric, widen in one direction and have an axial bore, and longitudinal slots extending essentially from the widened end face up toward the area of the narrower end face. The axial bore serves to accommodate the workpiece and a plastically deformable sleeve of the connecting elements for this workpiece. The elastically flexible crimping tongues between the longitudinal slots can be compressed in a quasi-hydrostatic manner by an axially symmetric clamping elements. During crimping, first of all the workpiece then the sleeve, or vice versa, can be inserted into the grips. The clamping element guided by the press stroke over the grips slides on their outer surface, which is conveniently designed as a plane cone or in a bell shape and can thus produce the axially symmetric force necessary.

8 Claims, 1 Drawing Sheet

REPLACABLE, AXIALLY SYMMETRIC SPECIAL TOOL FOR A PRESS

BACKGROUND OF THE INVENTION

The invention relates to a replaceable special tool for a press for joining connecting elements, arranged in the longitudinal or transverse direction on an incoming carrier belt or in a magazine guide to a front end of an inserted workpiece. Furthermore, the invention relates to a method of crimping workpieces by means of a special tool.

Numerous types of presses are known which, by means of special tools, serve to join, in particular, electrical conductor ends to connecting elements, such as, for example, terminals and/or plugs. A stripping device and a separating device for a carrier belt of electrical connecting elements are usually integrated in such presses.

As a rule, the ram stroke movement necessary for a press is produced by an electromechanically driven eccentric having at least one toggle lever. However, presses can also be operated hydraulically, pneumatically or manually.

In the company brochure "Crimptechnik", the company Multi-Tech-Machines AG, GH-2543 Lengnau, offers a plurality of eccentric presses which are designed as electrical crimping machines and constitute the latest state of the art. These crimping machines permit the use of all AMP-compatible crimping tools in longitudinal and transverse conveyors.

These crimping machines work with at least one crimper having an allocated anvil. The hard base is best suited to the crimping of wires, stranded wires and the like, but can pose considerable problems in the case of soft or resilient workpieces.

U.S. Pat. No. 4,217,084 relates to an apparatus for the crimping of fittings onto a bundle of optical fibers. A screw, when it turns, simultaneously sets pressure rollers in rotation, which are pressed together during advancement. As a result, a flexible sleeve inserted into the fitting is notched and pressed directly onto the optical fibers, whereby the crimping is produced.

Furthermore, U.S. Pat. No. 4,727,724 describes a crimping apparatus for the butt-splicing of two optical fibers with a very complicated apparatus, which makes a great many manipulations necessary.

The object of the present invention is therefore to provide an improved special tool of the type mentioned at the beginning and a method of operating it by means of a press which are suitable in particular for the crimping of soft and resilient workpieces. The press having the special tool is to work in a space-saving manner and its special tool is to deliver high-quality products at favorable investment and operating costs.

SUMMARY OF THE INVENTION

With regard to the device, the object is achieved according to the invention when the special tools designed as crimping tools comprise at least one pair of grips, which grips are designed to be axially symmetric, widen in one direction and have an axial bore which serves to accommodate the workpiece and a plastically deformable sleeve of the connecting elements for this workpiece, and longitudinal slots extending essentially from the widened end face up to the area of the other end face, elastically flexible crimping tongues between the longitudinal slots being compressible in a quasi-hydrostatic manner by an axially symmetric clamping element.

The longitudinal slots in the widening elastic grips create the space necessary to compress the crimping tongues. The axially symmetric configuration of grips and clamping element ensures that a uniform pressure can be exerted all round by the crimping tongues of the grips, which is designated as "quasi-hydrostatic".

The sleeve, which is plastically deformed during crimping, is preferably made of a soft, ductile metal. The sleeve is designed to be thinner and longer than in conventional crimping processes. Fluting develops during the compression of the grips, since the material of the sleeve is also pressed into the longitudinal slots between the crimping tongues of the grips. This pro-filing, which is obtained by cold working, increases the static strength of the sleeve. The sleeve material turned aside into the longitudinal slots forms a material deposit advantageous for the further use.

The longitudinal slots of the grips preferably run in a plane of the longitudinal axis or they are designed in a spiral shape with a large pitch. In other words, even spiral longitudinal slots conveniently deviate only slightly from the planes mentioned.

There is advantageously a large number of longitudinal slots and thus crimping tongues so that the hydrostatic pressure can be approximately achieved as far as possible The width of the crimping tongues preferably corresponds to one to three times the width of the longitudinal slots.

So that the necessary pressure can be achieved, the grips are in practice designed in a cone or bell shape on their outsides. Thus, controlled compression of the crimping tongues of the grips can be achieved per length unit of feed of the clamping element.

The inner surface of the grips, which is responsible for the shaping of the crimp connection, can in principle assume any shape. However, the relaxed crimping tongues of the grips must be able to lift from the crimp connection after load relief to such an extent that the workpiece can be removed without problem. For example, the inner surface of the grips can be designed to be smooth, stepped in the radial direction or rounded off three-dimensionally. During crimping with an inner surface of the grips which is rounded off three-dimensionally, a so-called "spherical crimp" results.

During the formation of steps or steep bevels, material deposits develop in the transverse direction in addition to the material deposits mentioned in the longitudinal slots.

The clamping element is conveniently designed as a cone, its widening in the end position corresponding to the widening of the grips. The clamping element can also be designed as a tube. In a particular embodiment, the clamping element also has longitudinal grooves which are congruent with longitudinal slots of the grips. Thus a thermoplastic adhesive, for example, can be sprayed onto the inserted workpiece. If the cone used as clamping element does not have sufficient mechanical strength, the grooves are closed at both ends on the longitudinal side.

The special tool of the press can be configured in such a way that the crimping tools comprise at least one group each of grips, rotatable and/or displaceable individually into an adjustable working position, and allocated clamping elements. Thus workpieces having different cross-sections can be worked in the same press. In the simplest case, the workpieces have a round cross-section, which considerably reduces the tool costs. With appropriate outlay, however, cross-sections different from round cross-sections can also be worked.

The method according to the invention for crimping workpieces by means of a special tool is distinguished by the fact that, in a press, a workpiece is pushed from one side into a pair of grips, then a sleeve of a connecting piece is pushed over the workpiece from the other side, a clamping element is pressed in the axial direction over the outer surface of the grips and withdrawn after reaching the end position, and the workpiece having the crimped-on connecting element is withdrawn.

The method according to the invention can of course also take place in such a way that first of all a sleeve of a connecting piece is inserted into a pair of grips and then a tool is pushed into the sleeve.

Modern presses corresponding to the state of the art are equipped in such a way that the sleeves of connecting pieces can be fed automatically and the workpieces can be pushed in alternatively in an automated manner or manually.

For the operating characteristic of the crimping tool, apart from a constant or adjustable press force of the press, particular attention has to be paid to the following normal parameters of the ram movement:

Dead center,
Total stroke length,
Length of the working stroke,
Working speed,
Different speed during a stroke period.

The tensile strength of a crimp connection can be increased if before the sleeve is inserted an adhesive, in particular a thermoplastic, is sprayed onto the tool fed into the grips.

The use of the special tool according to the invention and the application of the method are varied. As examples, the attachment of a connecting piece to a glass fiber provided with a strain-relief means or to a HF cable may be mentioned. In quite general terms, fittings or connecting pieces can be applied to soft or resilient bases, thus, for example, to a garden hose, in combination with an adhesive sprayed in place.

BRIEF DESCRIPTION OF THE DRAWINGS

The invention is described in greater detail with reference to exemplary embodiments which are shown in the drawing and which are also the subject matter of subclaims. In the drawing:

DETAILED DESCRIPTION OF THE INVENTION

Figure 1:
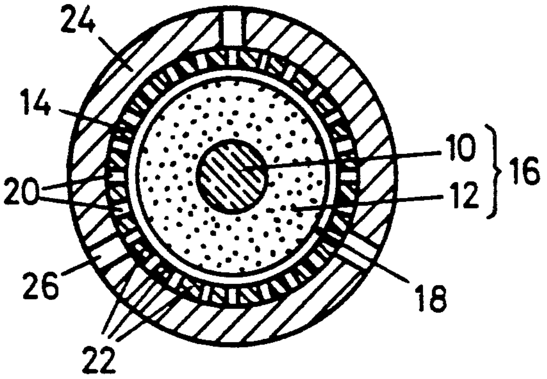
FIG. 1 shows a cross-section through a glass-fiber cable clamped into a pair of grips.

According to FIG. 1, a highly sensitive, optically conductive fiber 10 made of glass or a transparent plastic is embedded in a fibrous strain-relief means 12 which protects the fiber 10, designed as a multi layer optical conductor. Before insertion into the grips 14, the workpiece 16, formed from the optical fiber 10 and the strain-relief means 12, has been freed from the outer protective layer. From the side opposite the workpiece 16, a plastically deformable sleeve 18 made of metal or plastic is inserted into the bore of the grips 14.

By longitudinal slots 20, the grips 14 are subdivided into numerous crimping tongues 22 which can be elastically deformed in the radial direction.

The crimping tongues 22 are compressed by the advanced clamping element 24. The latter has three longitudinal grooves 26 which are distributed over the periphery and lie on one longitudinal slot 20 each of the grips 14. Thus a thermoplastic adhesive can be sprayed onto the strain-relief means 12 before the sleeve 18 is inserted.

Figure 2:
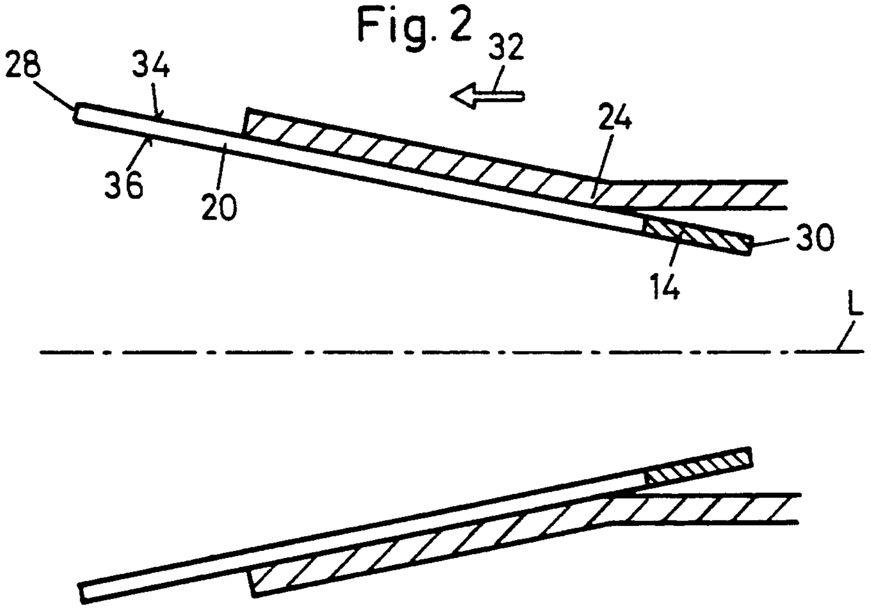
FIG. 2 shows a longitudinal section through a pair of grips having a mounted clamping element.

In FIG. 2, the aperture angle of the widening grips 14 is drawn greatly exaggerated for the sake of greater clarity. Two longitudinal slots 20 which extend from the widened end face 28 up towards the area of the narrower end face 30 can be seen in section. If the clamping element 24 is displaced in the direction of arrow 32, the crimping tongues 22 (FIG. 1) are compressed.

According to FIG. 2, the outside 34 of the grips 14 is designed as a smooth cone, as is the inside 36.

When the grips 14 are compressed, fluting develops on the outside of the sleeve 18 (FIG. 1) in the direction of the axis (L).

Figure 3:
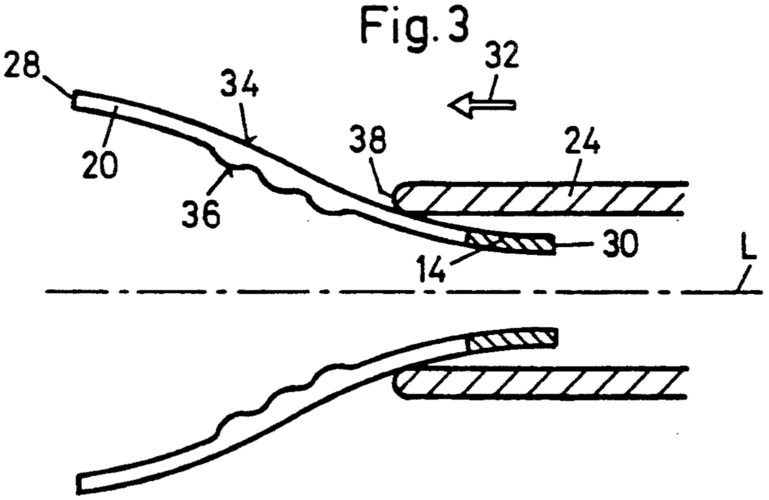
FIG. 3 shows a variant of FIG. 2.

In FIG. 3, the outer surface 34 of the grips 14 is designed in a bell shape. The sleeve-shaped clamping element 24 has a rounded-off edge 38 sliding on the outside 34 of the grips 14. The crimping tongues 22 (FIG. 1) are increasingly compressed during the press movement in the direction of arrow 32. The inside 36, provided with transverse beads, of the grips 14 presses corresponding profiles into the sleeve 18 (FIG. 1) and thus the workpiece. The beads mentioned increase the tensile strength of the crimped-on sleeve in longitudinal direction (L).

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. A crimping press having a replaceable crimping tool for joining a surrounding protective sleeve to a workpiece, said crimping tool comprising: a hollow, frustum conical shaped grip means defining an opening having a longitudinal axis for receiving said workpiece and surrounding protective sleeve, said grip means being provided with a plurality of longitudinally extending slots defining a plurality of crimping tongues; clamping means for reclamping said plurality of crimping tongues about said surrounding protective sleeve within said opening so as to plastically deform said surrounding protective sleeve and secure said surrounding protective sleeve to said workpiece, said clamping means having longitudinal grooves which are congruent with longitudinal slots of the grip means; and means for moving said clamping means along said longitudinal axis over said grip means for collapsing said plurality of tongues about said surrounding protective sleeve for securing said sleeve to said workpiece.

2. A press according to claim 1 wherein the slots lie on a plane leading through the longitudinal axis.

3. A press according to claim 1 wherein the width of the crimping tongues is about one to three times the width of the longitudinal slots.

4. A press according to claim 1 wherein the grip means has an outer surface and wherein the outer surface of the grip means is designed in a bell shape.

5. A press according to claim 1 wherein the crimping tongues have an inner surface designed to be smooth.

6. A press according to claim 1 wherein the crimping tongues have an inner surface designed to be stepped in the radial direction.

7. A press according to claim 1 wherein the grip means has an inner surface and wherein the inner surface of the grip means in the area of the crimping tongues is designed to be rounded-off three-dimensionally.

8. A press according to claim 1 wherein the clamping means is designed as a cone.

* * * * *